United States Patent [19]

Lutz et al.

[11] 4,413,259
[45] Nov. 1, 1983

[54] CASCADE MONITORING APPARATUS

[75] Inventors: Michael A. Lutz, San Carlos; Howard B. Kroymann, Menlo Park; Abdul M. Tayeb, San Leandro; Edward H. Softky, Menlo Park, all of Calif.

[73] Assignee: Raychem Corporation, Menlo Park, Calif.

[21] Appl. No.: 303,327

[22] Filed: Sep. 18, 1981

[51] Int. Cl.³ .................. G08B 19/00; H04Q 9/14
[52] U.S. Cl. .................. 340/825.06; 340/518; 340/825.65; 340/870.11
[58] Field of Search .................. 340/825.02, 825.06, 340/825.05, 825.57, 825.65, 825.67, 870.09, 870.11, 870.13, 518

[56] References Cited

U.S. PATENT DOCUMENTS

| | | | |
|---|---|---|---|
| 3,403,379 | 9/1968 | Perry | 340/870.11 |
| 3,761,878 | 9/1973 | Georget et al. | 340/168 R |
| 3,988,730 | 10/1976 | Valker | 340/518 |
| 4,114,138 | 9/1978 | Demers | 340/825.65 |
| 4,290,055 | 9/1981 | Furney et al. | 340/518 |

Primary Examiner—Donald J. Yusko
Attorney, Agent, or Firm—Derek P. Freyberg; Stephen C. Kaufman; Douglas A. Chaikin

[57] ABSTRACT

An apparatus for monitoring the value of one or more physical parameters, the apparatus including a plurality of physical monitoring modules, master electronics, and structure for interconnecting each of the modules and the master electronics. Each module includes a logic section and a transducer section. The logic section receives a logic signal and responds by activating the transducer. The logic signal is passed to the next module according to a clock pulse which is generated from the master electronics. The transducer senses a physical parameter. When activated, the transducer responds to the physical parameter with an electrical signal and communicates the electrical signal to the master electronics which utilizes the electrical signal for monitoring purposes.

6 Claims, 7 Drawing Figures

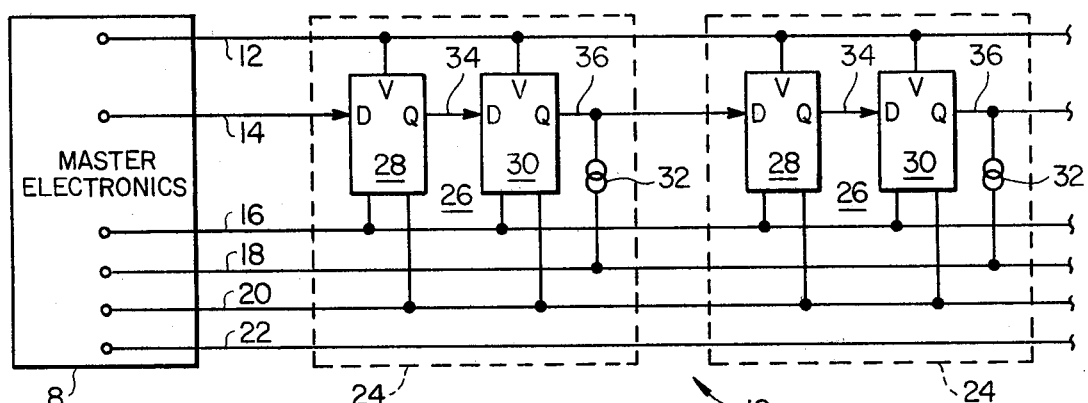
FIG_1
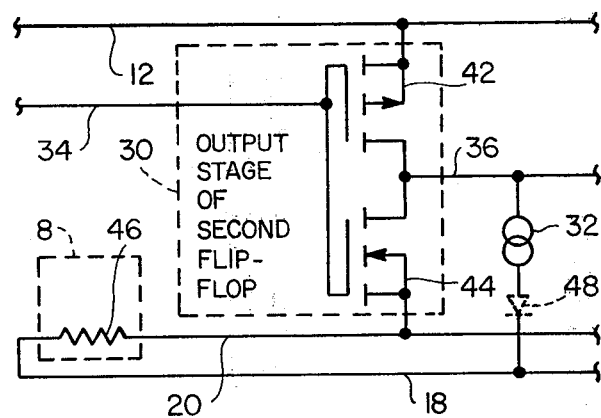
FIG_2
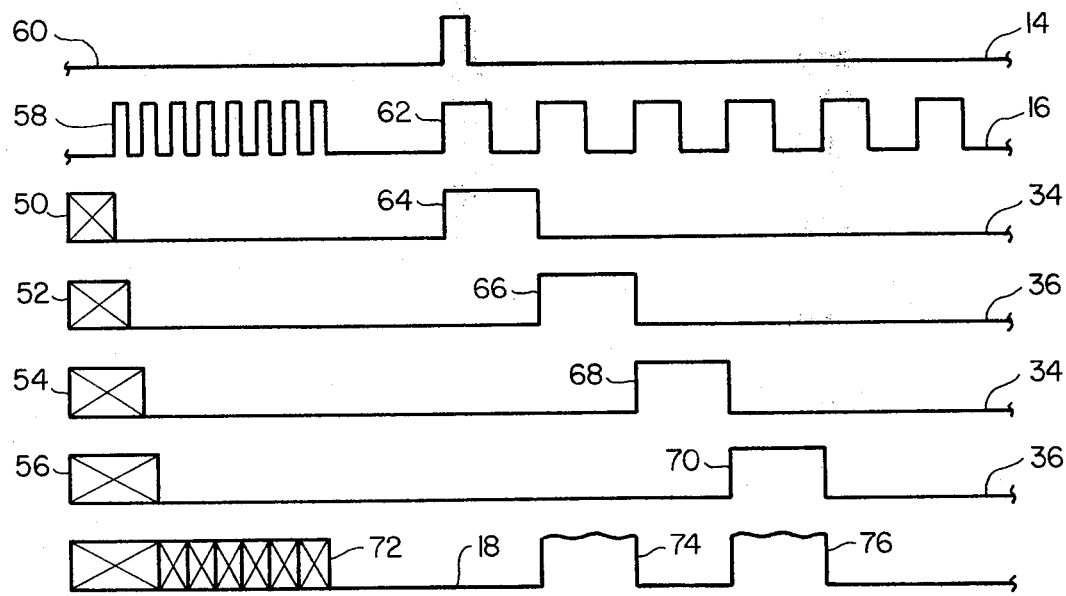
FIG_3

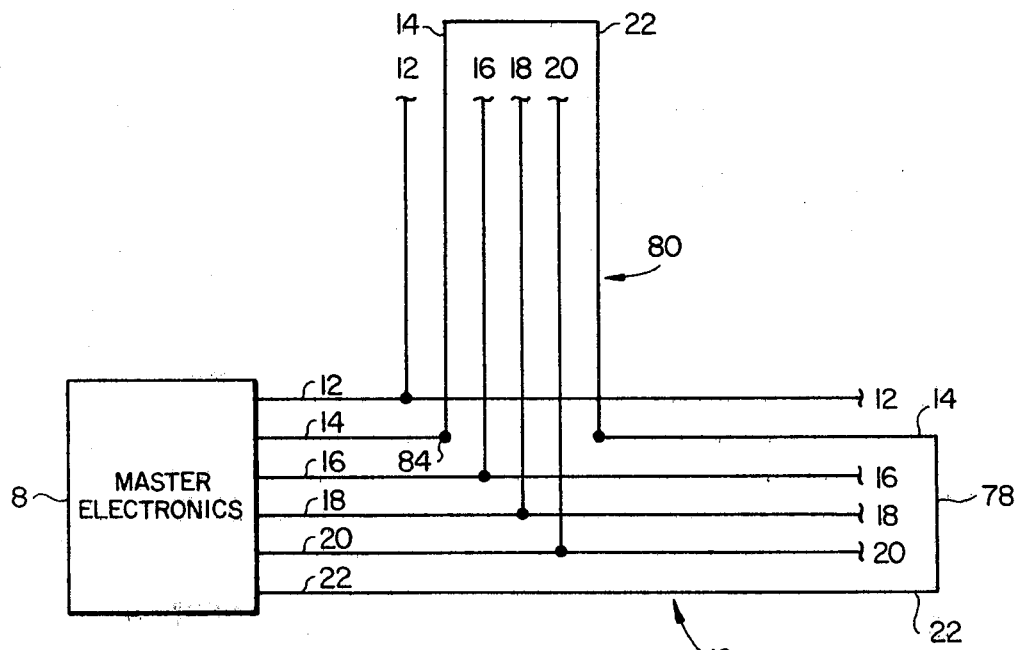
FIG_4
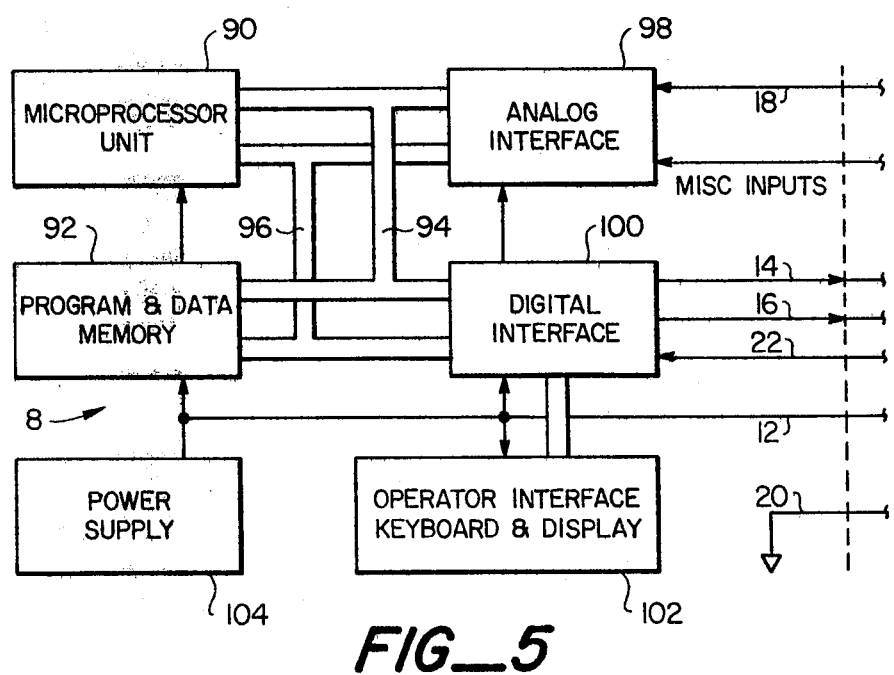
FIG_5

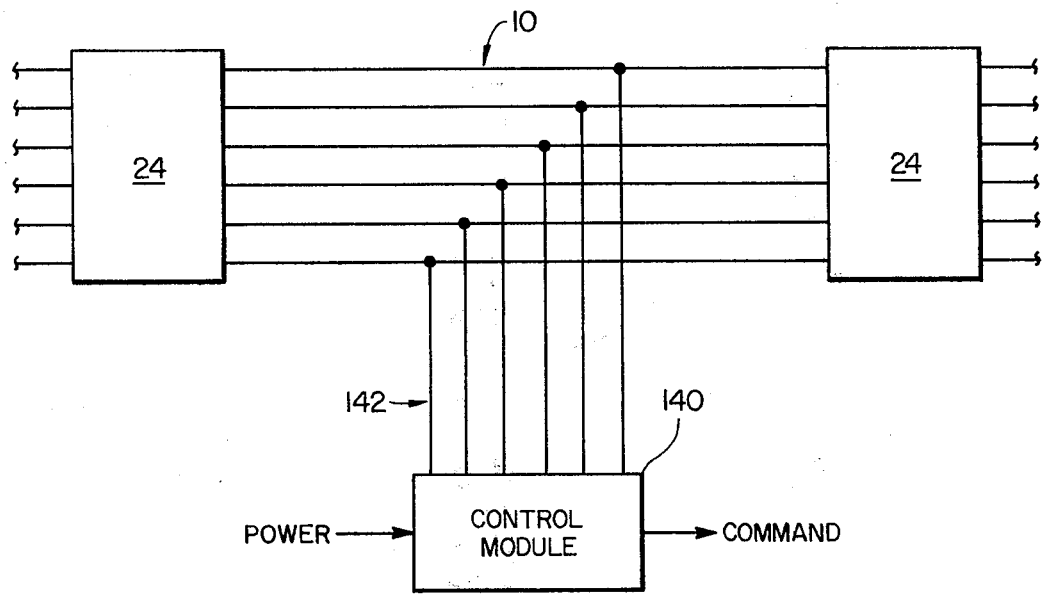
FIG_6
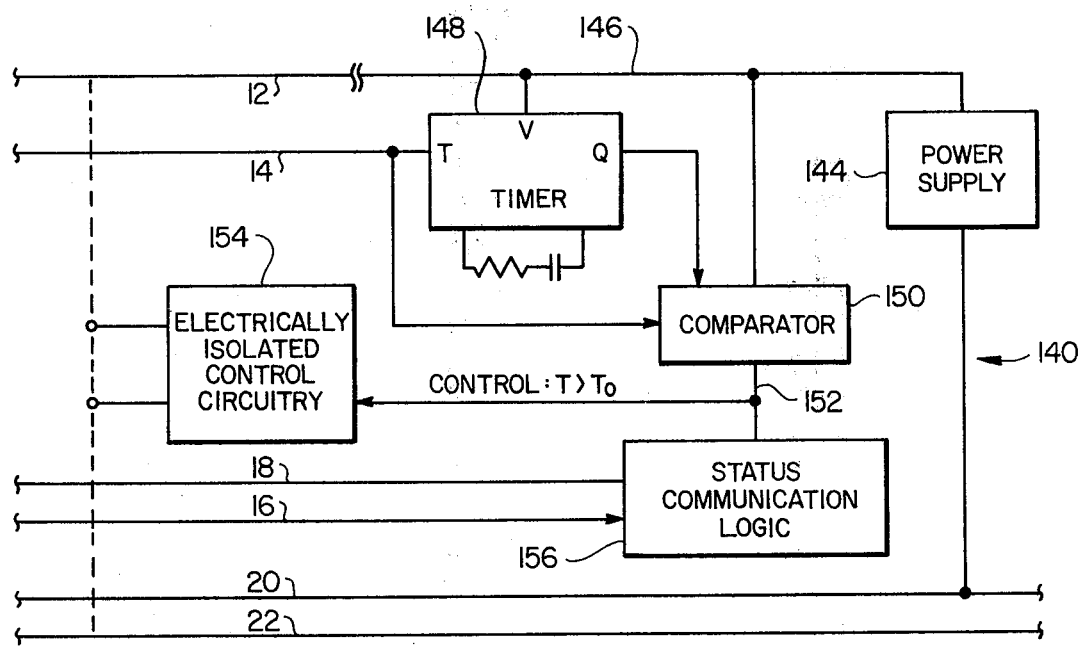
FIG_7

CASCADE MONITORING APPARATUS

BACKGROUND OF THE INVENTION

It is often necessary to know the value of a physical parameter over long distances or great areas. Pipelines are often heated to keep the contents from solidifying, so knowledge of the pipe temperature at a large number of points is quite useful. Telephone cables are often pressurized to keep moisture out, so knowledge of the pressure at a number of locations within the cable is of great value. Land is often fenced for security measures and knowledge of the fence motion at a large number of points can indicate the presence of intruders. Proper ground moisture is important for the growth of agricultural crops and knowledge of the ground moisture level at numerous locatons is important for intelligent control of irrigation equipment. Of course there are many other examples of extended or spatially distributed structures or equipment where knowledge of physical parameters measured at a great many location is useful.

Remote sensors typically utilize one or more wire pairs for connection to a central control room. The result is a great many wire pairs with attendant harnessing, connectors, conduit, expense, etc. Recent electronic advances have sought to alleviate excessive wiring through the use of multiplexing whereby one wire pair or co-axial cable connects numerous remote sensors. Any desired remote module can then be accessed by sending out an electronic address and requesting data or sending information. The difficulties with multiplexing are size and cost of the addressible modules. At present, each such module requires a separate integrated circuit to control the input and output of data. This integrated circuit is individually programmed to recognize its unique address, either through thumb-wheel switches or wiring. This adds expense in the labor to adjust the switches or do the wiring and keep track of the address number of each module so it may be identified after it is packaged. The addressible integrated circuit adds cost to the module as well as size because it is required in addition to whatever other transducers and data processing circuits are needed. This precludes multiplexing in applications where a great many locations need to be monitored by relatively small, inexpensive, remote modules.

An example of a two wire multiple address, multiplex structure, entitled "Two-wire, Multiple-Transducer Communications Systems", is disclosed in U.S. Pat. No. 4,083,946. In this disclosure, each data gathering device includes a decoder operative in response to a predetermined interrogating code upon the detection of which the associated data device is actuated for transmission of data to a central receiving unit.

An example of a pre-multiplexing communication system designed to communicate with a large number of remote sensors through a relatively small number of wires is illustrated by Brenner et al U.S. Pat. No. 3,824,545. In Brenner et al, a large number of remote modules or terminal stations are connected together by a single transmission line. Each terminal station is connected to master electronics by a number of information collecting lines. Each terminal station is activated in sequence by a pulse placed on the interconnecting transmission line. Once activated, data is placed on the information collecting lines. After a time delay, determined by the choice of components within the terminal station, the station becomes deactivated. A pulse is generated, thereupon, which propagates to the subsequent stations.

Brenner et al is directed to an intrinsic timing means wherein each module includes timing circuitry and components. These components add expense, are bulky and most importantly, are sensitive to temperature and other influences causing the activation time of successive modules to vary in an unpredictable way.

A slightly more advanced approach is illustrated in Leuhrmann et al, U.S. Pat. No. 3,461,445 wherein the remote module and the master electronics both include parts of the timing mechanism. In Luehrmann et al the master electronics sends out a triggering pulse to a remote module to close its relay, then extinguishes the current holding the relay closed, and then triggers the next module through the extinguished relay before the latter can drop open. Loss of power causes the electromechanical or hard-contact switch to reopen but only after the trigger pulse has been sent to the subsequent module. In this way Luehrmann et al comprises a two part timing mechanism having a portion which is external and a portion which is intrinsic within the module.

Electromechanical or hard-contact relays such as those utilized in Luehrmann for switching functions are not long lived. The relays are subject to vibrations and are relatively large and costly. Further, each successive module in Luehrmann is triggered just after the power is re-applied to the cable but before the energized relay reopens making for a very intricate sequence of operations which has the potential for reliability problems. Thus, which Luehrmann is directed and has as an object of its invention, a simple remote sensing unit, it can be seen that this remote sensing unit intrinsically includes a portion of the timing mechanism.

Other communication systems have been developed which use relatively complex modules such as Heimbigner, U.S. Pat. No. 3,601,806. Additionally others have used communication systems wherein a sequential application of voltage is applied to activate remote modules sequentially. An example of such a system is Perry, U.S. Pat. No. 3,403,379. However disadvantages of such a system include the size of the module and the limited life of the cable because of its susceptibility to vibration. Further, since the sequential application of voltage requires that each module be activated, the number of modules is limited as a result of the voltage drop at each junction.

The instant invention utilizes a small number of conductors (wires) to connect a large number of relatively small, inexpensive, remote monitoring modules. Neither multiplex address circuitry nor individual wire pairs nor electromechanical components are necessary for each module to monitor physical parameters along the cable of the instant invention.

OBJECTS OF THE INVENTION

An object of the instant invention is to provide an apparatus for monitoring one or more physical parameters at a number of locations and utilizing the values of the parameters for monitoring purposes at a common location.

Another object of the instant invention is to provide a monitoring apparatus which is economical and does not require multiplexing.

Another object of the instant invention is to provide a monitoring apparatus which is easily modified, spliced, branched, or repaired in the field.

Another object of the instant invention is to provide a cable which is useful in great lengths and is relatively insensitive to electromagnetic interference and other extraneous influences.

Another object is to utilize remote monitoring modules of relatively small size and low cost.

Another object of the instant invention is to monitor a desired physical parameter with identical modules.

Another object of the instant invention is to monitor different physical parameters wherein each physical parameter is monitored by a set of identical modules.

Another object of the instant invention is to provide an apparatus which utilizes monitoring modules of relatively low cost and lesser accuracy than the overall accuracy of the apparatus.

Another object of the instant invention is to provide an apparatus capable of producing alarm and control signals when the value of the physical parameter measured at any remote location extends beyond preset levels.

SUMMARY OF THE INVENTION

The instant invention is a practical way to monitor one or more physical parameters at a plurality of locations. The instant invention includes a plurality of monitoring modules which are interconnected to one another and to master electronics.

Each monitoring module includes a logic section and a transducer section which converts the value of the sensed physical parameter at that location to an electrical signal when the transducer section is activated. The master electronics reads the output of all the transducer sections sequentially. The master electronics sends a logic signal to the first monitoring module. The logic section receives the logic signal and subsequently activates its associated transducer section. The activated transducer converts the value of the sensed physical parameter to an electrical signal and communicates that signal to the master electronics. The electrical signal is utilized by the master electronics for monitoring purposes. In one embodiment, subsequent clock pulses transfer the logic signal to the next module. In this way, each logic section sequentially receives the logic signal, thereby repeating the above-described process. When the end of the cable is reached, the logic signal is received by the master electronics and the process begins again.

In the above-referenced embodiment, two clock pulses may be utilized to transfer the logic signal between adjacent modules. This is done to create a zero output dead band on the measurement wire between the electrical output of each of the transducer. This enables the master electronics to count dead bands and keep a running count of which module is activated. Counting dead bands provides a means of identifying which module is activated without relying solely on counting clock pulses.

DESCRIPTION OF THE DRAWINGS

FIG. 1 illustrates, in schematic form, a wiring diagram for one embodiment of the apparatus in accordance with this invention.

FIG. 2 is a portion of the monitoring module in schematic form.

FIG. 3 is a timing diagram which is used with the embodiment shown in FIG. 1.

FIG. 4 illustrates a branched and terminated apparatus in accordance with this invention.

FIG. 5 illustrates, in schematic form, one embodiment of the master electronics.

FIG 6. illustrates, in schematic form, the instant invention having a control module.

FIG. 7 illustrates in schematic form, one embodiment of the control module.

DETAILED DESCRIPTION OF THE INVENTION

The instant invention is an apparatus for monitoring the value of one or more physical parameters. The apparatus includes a plurality of physical monitoring modules, master electronics, and structure for interconnecting each of the modules and the master electronics. Each module includes a logic section and a transducer section. A predefined high or low logic signal is received from the master electronics by the logic section. The logic section responds to the logic signal by activating its associated transducer section, e.g. the transducer within that module or whichever transducer is electrically connected to that logic section and subsequently passing the logic signal to the next module. The activated transducer converts the physical parameter sensed to an electrical signal and communicates that signal to the master electronics. The master electronics receives the signal and utilizes it for monitoring purposes. The master electronics may correct the measurement for known transducer errors and perform computations and comparisons as well as display the information.

In one embodiment of the monitoring apparatus in accordance with this invention, the master electronics includes a clock which sends a clock pulse to all modules simultaneously. The clock pulse causes the high or low logic signal at the input to every module to advance to within the module and causes the high or low logic signal within the module to advance to the output of the module and hence to the input of the succeeding module. Use of a clock is desirable because the rate of propagation of the logic signal down the cable is controlled by the master electronics and can be changed as required. The clock frequency is determined by a trade-off between the need to measure the electrical output of the transducer for a long enough time to get an accurate value (independent of electrical noise) and still interrogate all modules quickly enough to detect significant temporal changes in the parameters of interest. Counting clock pulses and dividing by two also gives the location of the module containing the activated transducer.

Further, the instant invention may include an additional wire called a branch line. As disclosed in patent application Ser. No. 269,933, use of a branch line aids in branching and otherwise modifying the monitioring apparatus in the field.

It will further be appreciated that not all of the transducers or sensing means need sense the same physical parameter. Rather, a monitoring apparatus in accordance with this invention may sense many different parameters in the same cable. In order to reduce the number of wires in a particular apparatus, the transducer signal should be of identical form so that it may be received along the same wire by the master electronics. Of course this is not necessary to carry out the invention. It will be appreciated that a number of different lines could be used if the electrical signal from the transducer were of a different form.

As will be discussed more fully hereinafter, the monitoring apparatus in accordance with this invention may use relatively low cost transducers which have a wide tolerance range. It is not necessary for the carrying out of this invention that the transducers be particularly accurate or within a narrowly defined tolerance range because the structure of the apparatus provides for the use of wide tolerance, low cost transducers.

FIG. 1 illustrates in schematic form, a six wire embodiment of the monitoring apparatus in accordance with this invention generally denoted by the numeral 10. The cable includes a voltage wire 12, a data wire 14, a clock wire 16, a measurement wire 18, a common wire 20 and a branch wire 22. The apparatus 10 further includes a plurality of modules 24, each having logic sections generally denoted by the numeral 26, which in this embodiment comprises two type D flip-flops 28 and 30 and a transducer section 32. The module 24 is typical of many such modules attached to the six wire cable embodiment to provide the monitoring function of the instant invention. All of the wires are continuous except the data wire 14 which is broken at each module 24 so that the information on the data wire 14 must traverse the module itself.

The flip-flops 28 and 30 are commercially available as a single dual-in-line package integrated circuit such as a Motorola MC14013. Where temperature is the physical parameter of interest, integrated circuit transducer 32 preferably passes a current in direct proportion to the temperature, such as the Analog Devices AD590. This transducer is relatively insensitive to applied voltage over the range 4–30 V and does not pass current in the reverse direction.

An electrical voltage is applied between voltage wire 12 and common wire 20 with wire 12 being made positive relative to common wire 20. This supplies electrical power to all modules 24 along the apparatus simultaneously. Segment 34 of data wire 14 is shown only to assist in understanding the invention. Clock wire 16 provides electrical impulses to all flip-flops 28 and 30 in the apparatus simultaneously. Measurement wire 18 is connected to the negative end of all the transducers 32 in the cable. The branch wire 22 is not electrically connected to the module and its operation will be explained hereinafter.

Normal operation of a type D flip-flop causes the logic level at the D input to be copied to the Q output slightly after receipt of a clock pulse. In the instant embodiment, a single high logic level on one segment of the data wire is caused to propagate down the cable at a rate determined by the clock frequency. Thus if data wire segment 14 has a momentary logic high and data wire segments 34 and 36 have logic lows, the first clock pulse transfers the logic low from 34 to 36 and the logic high from 14 to 34. A second clock pulse makes 36 logic high and 34 logic low because 14 has returned to logic low prior to this pulse. The desired logic level propagation is thus accomplished.

In any given module, the transducer section is activated by its associated logic section. In the embodiment shown, this occurs when the output data wire segment 36 is in a logic high state. FIG. 2 illustrates the output stage of the second flip-flop 30 in a monitoring module 24. Data wire segment 36 is switched to a logic high state by activating field effect transistor 42 and deactivating field effect transistor 44, thereby effectively connecting 36 to voltage wire 12 which provides power to operate the transducer section 32. The current flowing through transducer section 32 is a measure of the physical parameter at that location. The current is converted to a voltage by resistor 46 at the input to the master control electronics 8. Subsequently, transistor 44 is switched on and transistor 42 is switched off thereby de-activating transducer section 32.

It is important to note that all the transducer sections 32 in the monitoring apparatus 10, except the one which is activated, are connected between measurement wire 18 and common wire 20 in the embodiment shown in FIGS. 1 and 2. This is because transistors 44 are switched on for all modules except the one which is activated. Even for the one which is activated, if data wire 34 has a logic high, the transducer at the output of that activated module is also connected between measurement wire 18 and common wire 20 through transistor 44. Now measurement wire 18 goes positive in voltage relative to common wire 20 whenever any transducer in the cable is operating, effectively applying a back voltage to all non-operating transducers. It is essential that negligible current flow in the reverse direction through the transducers if good measurement accuracy is to result. If the transducers utilized do not inherently block reverse current flow a diode 48 can be placed in series with each transducer 32 as shown in phantom in FIG. 2.

As illustrated in FIG. 3, when the system is first powered up, the logic state of all flip-flops is undetermined as shown at 50, 52, 54 and 56 and it is necessary to first clear the data wire 14 of any logic high segments. In the present embodiment, this is accomplished by operating the clock (perhaps at a higher than normal frequency) with the data wire 14 held to a logic low state at the master electronics. This is represented by the high frequency clock pulses 58 at the left end of the clock line and the logic low level at the left end 60 of the data wire 14. The cascade measurement process then begins. The master electronics places a logic high on the data wire 14 and initiates the clock.

As can be seen in FIG. 3, prior to the negative going portion of the clock waveform, the data wire 14 is returned to a logic low and remains low until the entire apparatus is interrogated. The first clock pulse 62 moves the logic high to data wire segment 34 of the first module of FIG. 1 shown in FIG. 3 at 64. The second clock pulse moves the logic high to data wire segment 36 of first module 24 which correlates to 66 of FIG. 3. Note that the transducer 32 in the first module is now activated and puts a current on the measurement wire in proportion to the value of the physical parameter being monitored. The third clock pulse moves the logic high to data wire segment 34 of the second module which correlates to 68 of FIG. 3. The fourth clock pulse moves the logic high to data wire segment 36 of the second module 24 which correlates to 70 in FIG. 3. The transducer 32 of the second module is then activated and the process as described above continues.

Also as seen in FIG. 3, the transducer in each module is in an indeterminate output state initially, as shown at 72. When the transducers 32 of each module are sequentially activated as described above, they transmit an electrical signal, indicated at 74 and 76 for the first and second modules, respectively.

In the embodiment so far discussed, every other clock pulse produces a zero current period on the measurement wire 18. Counting zero current periods is a convenient way to determine which module's transducer is to be activated at the next clock pulse. This provides a cross check with a count of every other clock pulse to determine location. As shown in FIG. 4, when the logic high reaches the output of the last module, a logic high is placed on the branch wire 22 which may be connected at the end of the cable 10 to the data wire 14 by wire 58. This provides a third check whereby the master electronics can verify that it has received a signal from each of the modules known to be present in the apparatus.

The branch wire 22 is also useful in applying the cable to complex, branched pipelines or structures according to the teachings of a recent patent application by Howard Kroymann entitled "Bi-Directional Temperature Execursion Sensing and Locating Apparatus" Ser. No. 269,933, which is specifically incorporated herein by reference and which has been commonly assigned to the assignor of this patent application, Raychem Corporation. As shown in FIG. 4, the branch cable 80 is spliced to the mainline cable 10 with a one-to-one correlation between six wires except the data wire 14 is broken just after the branch point 84 and connected to branch wire 22. For simplicity both the branch and main cables are shown without modules attached.

A block diagram of the master electronics generally denoted by the numeral 8 is shown in FIG. 5. Microprocessor unit 90 is interfaced with program and data memory 92 through data bus 94 and address bus 96. Buses 94 and 96 also connect the microprocessor unit 90 to analog interface 98 and digital interface 100. Analog interface 98 accepts analog data from the measurement wire 18 and converts the analog data to digital form suitable for processing by the microprocessor. The analog interface 98 also accepts additional miscellaneous inputs such as power supply voltages, temperature of the master electronics package, etc., and converts them to digital form for monitoring by the microprocessor. Digital interface 100 supplies data and clock waveforms to the apparatus, accepts input from the branch wire 22 to determine end of apparatus condition, and interfaces the operator keyboard and display 102. Power supply 104 supplies power to all parts of the system.

The spatial resolution of the sensing cable is dependent on the spacing of the monitoring modules. The spacing is determined through a trade-off between the advantage of larger spacing (lower cost) and the disadvantages of larger spacing (decreased spatial sensitivity and resolution). As a practical matter, monitoring modules spaced at intervals of three feet are sufficient for critical applications with intervals of ten or more feet being generally adequate. When temperature is the monitored parameter, the objects being monitored often exhibit substantial thermal conduction in the axial direction. Thus, a short hot or cold length will be cooled or heated respectively by adjacent regions such that a localized thermal excursion will expand to a longer length before stabilizing. For example, consider a one inch diameter pipe of infinite extent being heated by a strip heater along its length. Failure of the heater over an inch of length will eventually cause a cooler than normal zone over about a foot, depending on specific conditions. Larger pipes produce larger cool zones due to increased axial conduction. In summary, the use of discrete monitoring modules spaced by application-dependent intervals provides adequate spatial sensitivity. In many applications, the cable is used to monitor the condition of discrete pieces of equipment. For example, the undercarriage of a mass transit rail vehicle has six to ten critical pieces of equipment susceptible to overheating. The spacing of the equipment is the same for all vehicles so a standard cable with variable spacing monitoring modules may be used where each module is located adjacent to the piece of equipment to be monitored. In this example, the cable serves as a communication system whereby discrete monitors, located at specific pieces of equipment, are connected together in a cost-effective way.

The transducer section of each module may be calibrated for accuracy of the measurement. To achieve the highest accuracy, it is the ordinary course to choose the highest accuracy transducers available. However, it is necessary to minimize the cost of the monitoring modules and hence the transducer section because many modules may be used per cable. There are two alternatives for achieving high overall sensing accuracy with low cost transducers having only moderate accuracy. The first alternative includes sorting transducers upon receipt according to their calibration offset and building one particular cable out of transducers with the same offset. Final trimming is done by adjusting a resistor or other component in the master electronics. Using temperature as an example, integrated circuit temperature transducers can be purchased with an initial calibration offset at 25° C. of ±10° C. or ±1° C., the latter costing perhaps ten times the former. But if ±10° C. parts are brought to a common temperature and sorted into eleven bins according to their reading, then a cable made up of transducers from any one bin will have a differential offset error of 2° C. along the length of the cable. Compensating for the absolute offset with a variable resistor at the end of the measurement wire then gives 2° C. error.

Another alternative makes use of microprocessor-based master electronics. Instead of sorting transducers prior to cable assembly, the moderate accuracy transducers are utilized without any calibration check. Once the cable is manufactured, it is brought to a known, uniform temperature over its length. The microcomputer then reads the indicated temperature at each module as is done during normal operation. The error between the known temperature and the measured temperature is measured, stored in memory, and used thereafter to correct the readings.

It will be appreciated that it is not necessary to restrict the choice of transducer to one which passes a current in proportion to the value of the physical parameter being measured. Many types of transducers can be utilized for the measurement of many kinds of parameters such as moisture, pressure, acceleration, gas concentration, etc. Transducers in general utilize many different physical quantities such as variable voltage (EMF), resistance, capacitance, inductance, and the like. Consider, for example, the use of a temperature sensitive resistor (thermistor) in place of the variable current transducer 32 in FIG. 1. The current in the measurement wire will be related to the temperature at the thermistor because the voltage placed on the thermistor is equivalent to the voltage on wire 12 of FIG. 1 is known. To avoid any conventional current flow backwards through the thermistor into the common wire when the module is not activated, a diode can be placed in series with the thermistor.

If several kinds of transducers are utilized which produce electrical outputs of varying form (e.g. current, voltage, frequency) it is necessary to convert the outputs of each transducer to a common form if a single measurement circuit in the master electronics is to be utilized. Alternatively, multiple measurement wires may be utilized, one for all transducers producing an output of common form #1, one for all transducers producing an output of common form #2 and so on, and utilizing different measurement circuits in the master electronics for each measurement wire.

It is also possible to control equipment and machinery and determine the status of such equipment and machinery at multiple locations along the cable by controlling the duration of the logic high on the data wire at the location of the control module. FIG. 6 shows the connection between a control module 140 and the six wire cable embodiment 10 at a location between two monitoring modules 24. The control module 140 may be physically spaced away from the six wire embodiment 10 by means of an extension cable 142 and located in a convenient place, close to auxiliary power and equipment controls. Auxiliary power is preferred for the control module because it may require more power for its operation than is conveniently available from the embodiment 10.

FIG. 7 is a diagram of control module 140. Cable power, available between wires 12 and 20 is not utilized. Instead, a separate power supply 144, isolated from the local power source, is employed and referenced to the complete system by connecting common wire 20 to the negative output. Positive power supply voltage is then available on wire 146.

In operation, timer 148 activates on the positive transition of data wire 14 towards a logic high. Timer 148 provides a logic high to comparator 150 for the duration of a characteristic time $T_o$ determined by the RC network connected to timer 148. Comparator 150 activates control wire 152 when data wire 14 has remained in the logic high condition for a time T greater than $T_o$. Thus, to actuate any control module 140 along the apparatus 10, it is only necessary to sustain the logic high on data wire 14 at that location for a time T greater than $T_o$.

In the simplest case, activation of control wire 152 causes a relay closure which activates or deactivates equipment or machinery. This is accomplished by means of electrically isolated control circuitry 154 to insure that local power transients or ground loops are not coupled into the electrical system of the instant invention. More sophisticated control is possible by providing a control signal which is dependent on the length of time that data wire 14 remains in the logic high state, dependent on the voltage on wire 12, etc.

Status communication logic 156 places an output on measurement wire 18 which is superimposed on the output already on the measurement wire due to the transducer at monitoring module 24 on the master electronics side of the connection of the control module 140 to apparatus 10. This additional output measured by the master electronics 8 confirms that the control activation signal did indeed occur. More sophisticated means of status monitoring are possible. Rather than just indicating that a control signal has been issued, the status of the controlled equipment or machinery could be monitored by use of a supplemental transducer which measures the controlled function and electronics which converts the transducer output to an output signal of suitable form which is superimposed on the existing output on the measurement wire.

Alternatively, standard multiplexing circuits can be utilized whereby each control module can be randomly accessed, utilizing the cable of the instant invention as the signal carrier. There are many other alternatives to the control apparatus described above. One would be to add another control wire to the cable which is connected to all control modules. Any control module is then activated when the data wire and the control wire are logic high simultaneously. Since the data wire is logic high only at one location at a time and that location is known, any desired control modules can be activated during a normal cable read-out sequence.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the appended claims rather than the foregoing description and all equivalents thereto being intended to be embraced therein.

What is claimed is:

1. An apparatus for monitoring a value of at least one physical parameter at a plurality of points, comprising:
    a plurality of monitoring modules, each module having a logic section and a transducer section associated therewith, wherein
        the logic sections are connected in series and identical in their response to a logic signal, wherein
            each logic section activates its associated transducer section upon receipt of the logic signal, and
            each logic section sequentially passes the logic signal to the next module; and
        each activated transducer transmits a continuous electrical signal in response to and in correspondence with the physical parameter sensed, for continuously monitoring changes in the parameter sensed;
    master electronics for sending an initial logic signal to the module to which it is connected and utilizing the continuous electrical signal for monitoring purposes;
    the master electronics including a clock circuit for generating a clock pulse for timing the transfer of the logic signal through each module, and
    means for electrically interconnecting the modules to each other and the master electronics.

2. The apparatus as set forth in claim 1, wherein each activated transducer section transmits a continuous electrical signal of identical form in response to the physical parameter sensed.

3. The apparatus as set forth in claim 1, wherein the apparatus includes a branch wire so that the apparatus may be easily branched.

4. The apparatus as set forth in claim 1, wherein the apparatus includes at least one module having a transducer section which senses a different type of physical parameter than the other transducer sections.

5. The apparatus as set forth in claim 1, wherein the apparatus senses more than two types of physical parameters.

6. The apparatus as set forth in claim 1, wherein the transducer sections comprise low accuracy transducers.

* * * * *